(12) United States Patent
He et al.

(10) Patent No.: US 11,846,079 B2
(45) Date of Patent: Dec. 19, 2023

(54) FAST-LAID FLOATING BREAKWATER

(71) Applicant: ZHEJIANG UNIVERSITY, Hangzhou (CN)

(72) Inventors: Fang He, Hangzhou (CN); Jindi Li, Hangzhou (CN); Siheng Li, Hangzhou (CN); Xiao Tang, Hangzhou (CN); Zhengyu Hu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 58 days.

(21) Appl. No.: 17/551,056

(22) Filed: Dec. 14, 2021

(65) Prior Publication Data

US 2022/0106751 A1    Apr. 7, 2022

Related U.S. Application Data

(63) Continuation of application No. PCT/CN2021/070640, filed on Jan. 7, 2021.

(30) Foreign Application Priority Data

Jan. 26, 2020 (CN) .......................... 202010077270.8

(51) Int. Cl.
*E02B 3/06* (2006.01)

(52) U.S. Cl.
CPC .................................. *E02B 3/062* (2013.01)

(58) Field of Classification Search
CPC ....................................................... E02B 3/062
See application file for complete search history.

(56) References Cited

U.S. PATENT DOCUMENTS 4,425,053 A  *  1/1984  Muto ................... E02B 15/0814
                                                              405/63
6,715,958 B2    4/2004  Wittenberg et al.
(Continued)

FOREIGN PATENT DOCUMENTS

CN      201180266 Y    1/2009
CN      202194110 U    4/2012
(Continued)

OTHER PUBLICATIONS

International Search Report (PCT/CN2021/070640); dated Apr. 9, 2021.
First Office Action(202010077270.8); dated Sep. 25, 2020.

*Primary Examiner* — Carib A Oquendo
(74) *Attorney, Agent, or Firm* — W&G Law Group

(57) ABSTRACT

Disclosed is a fast-laid floating breakwater, which belongs to the field of ocean engineering and includes a foldable net cage, box-type rubber airbags, a counterweight system and a mooring system. The foldable net cage includes frames and a flexible net, and the frames divide the net cage into cabins. An air valve is provided at the upper part of each box-type rubber airbag and connected to the net, and the airbags are fixed in the cabins. The counterweight system is provided at the bottoms of the frames. The mooring system includes pull rings, mooring chains and anchors; the pull rings are connected to two sides of the lower end of each frame. The immersion depth of the breakwater can be regulated through weights of the frames and the counterweights, thereby fastening the breakwater laying.

7 Claims, 3 Drawing Sheets

(56) References Cited

U.S. PATENT DOCUMENTS

| | | | | |
|---|---|---|---|---|
| 2008/0279632 A1* | 11/2008 | Bishop | ................... | F42D 5/045 |
| | | | | 405/21 |
| 2012/0087730 A1* | 4/2012 | Berger | ................... | E02B 15/06 |
| | | | | 405/63 |
| 2014/0178130 A1* | 6/2014 | Kamei, II | ................. | E02B 3/06 |
| | | | | 405/26 |
| 2014/0224164 A1 | 8/2014 | Mann et al. | | |
| 2016/0289907 A1* | 10/2016 | DeCew | ..................... | E02B 7/38 |
| 2020/0128798 A1* | 4/2020 | Shi | ........................... | F03D 9/43 |

FOREIGN PATENT DOCUMENTS

| | | | |
|---|---|---|---|
| CN | 103485309 | A | 1/2014 |
| CN | 104790344 | A | 7/2015 |
| CN | 106677120 | A | 5/2017 |
| CN | 108842718 | A | 11/2018 |
| CN | 109162243 | A | 1/2019 |
| CN | 110219280 | A | 9/2019 |
| CN | 209636723 | U | 11/2019 |
| CN | 111254873 | A | 6/2020 |
| KR | 101312563 | B1 | 9/2013 |
| KR | 20140082192 | A | 7/2014 |

\* cited by examiner

FAST-LAID FLOATING BREAKWATER

TECHNICAL FIELD

The present disclosure relates to the field of ocean engineering, and in particular, to a fast-laid floating breakwater.

BACKGROUND

Breakwaters, as coastal engineering structures, have the main functions of protecting harbors from wave attack and maintaining the tranquility of harbor basins, so that safe berthing, loading and unloading operations of ships and personnel embarkation and debarkation in the harbors are ensured.

With ocean development continuing to develop into the deep sea, construction difficulty and costs of conventional bottom-mounted breakwaters are constantly increasing, and problems such as marine environment pollution easily caused by the limited water body exchange exist. According to researches and experiments of wave theory, it is found that wave energy is mainly concentrated near the water surface, and nearly 90% of wave energy is concentrated in a depth of 3 times a wave height below the water surface. Floating breakwaters are widely concerned by scholars worldwide due to their advantages of being less influenced by the water depth, seabed foundation and tidal range, environment-friendly and the like.

However, existing semi-permanent floating breakwaters are mostly made of steel and concrete. Meanwhile, the existing floating breakwaters are usually of large sizes and have large dead weights, so long-distance transportations are inconvenient. In addition, existing floating breakwaters often have complex structures and a long construction cycle, and floating modules are mostly connected with each other through connection units, which leads to the complication of installation and disassembly and heavy construction workload.

For situations such as temporary protection for marine construction, emergency protection for salvage and rescue, and the like, a floating breakwater that has a light dead weight, is concise and flexible, and can be fast laid is needed to weaken the wave attack.

Among related solutions disclosed in relation to the fast-laid floating breakwaters, no related technical solution exists in which a breakwater can change its protected sea area by inflating different numbers of airbags and bending at a particular angle by enabling one certain airbag to be in an uninflated state. Therefore, there is a need to develop a technical solution of a novel fast-laid floating breakwater that is suitable for protecting seas with different areas and different wave conditions, so that the floating breakwater's integrity can be strengthened, laying rapidity can be enhanced, and adaptability to different wave conditions can be improved.

SUMMARY

The present disclosure overcomes the defects in the prior art and provides a fast-laid floating breakwater. The breakwater combines a foldable net cage and box-type rubber airbags, which can reduce the mass of the floating breakwater and enhance the laying rapidity, so the reuse rate and efficiency of the floating breakwater are improved.

In order to solve the above technical problems, the present disclosure adopts the following technical solution.

A fast-laid floating breakwater includes a foldable net cage, a plurality of box-type rubber airbags, a counterweight system and an anchoring system. The foldable net cage consists of a plurality of frames and a flexible net, and the plurality of frames are connected to the flexible net to divide the foldable net cage into a plurality of cabins; each of the plurality of box-type rubber airbags is fixed in the each of the plurality of cabins, and an air valve is set at the upper part of each of the plurality of box-type rubber airbags and is connected to the flexible net; the counterweight system is provided at bottoms of the plurality of frames; the anchoring system is connected to the plurality of frames to achieve anchoring of the foldable net cage.

Further, the foldable net cage is divided into a plurality of cabins by the plurality of frames, each cabin includes a respective box-type rubber airbag inside, and the size of the box-type rubber airbag when fully inflated is consistent with that of the corresponding cabin; in this case, the cabin can be unfolded automatically. When the box-type rubber airbag is not inflated, the corresponding cabin can be folded to store or connect to the net cage at two sides at any angle, so that the shape of the breakwater can be changed. When none of the box-type rubber airbags is inflated, the breakwater can be folded to store. When all the box-type rubber airbags are inflated, the breakwater can be unfolded automatically into a straight-line shape. With the inflation of some box-type rubber airbags, breakwaters in various shapes can be constructed to meet different requirements on the protection capability from wave attacks.

Further, the frames are connected to the flexible net, a plurality of rings are welded at the lower end of the frames, and a pull ring is connected to each of two sides of the lower end of the frames. The frames, rings and pull rings are made of steel materials with anti-rust coatings. On the one hand, the steel materials increase the dead weights of the frames to satisfy the requirement on the immersion depth of the breakwater, and on the other hand, the steel materials have enough strength.

Preferably, the flexible net is made of one of polyester, cotton and nylon rope.

Further, the box-type rubber airbags are of the hollow inflation structure and made of natural rubber, the air valve is set at the upper part of the airbag and connected to the net through a tightening belt, the airbags are fixed in the cabins of the net cage where the size of the airbag when fully inflated is consistent with that of the corresponding cabin, and only one cavity exists in the airbag.

Further, the counterweight system includes a plurality of counterweights, and each counterweight has a spring hook welded to its upper end and a ring welded to its lower end; connections between the counterweight and the frame, and between two counterweights are realized through the spring hook and the ring. The spring hook provided at the upper end of the uppermost counterweight is connected to a ring provided at the bottom of the frame, and the spring hook provided at the upper end of a lower counterweight is connected to the ring provided at the lower end of the upper counterweight; and the counterweights are in a shape of cube or cylinder and are made of metal. The number of the counterweights is determined based on the requirements on the immersion depth and the number of inflatable airbags, thus the gravity center of the floating breakwater can be ensured below the buoyancy center.

Further, an upper end of the mooring chain is connected to the pull ring located at each of two sides of the lower frame (under normal conditions, not all the frames are required to be connected to the mooring chain, and some frames not connected to the mooring chain can be alternatively arranged as needed) and a lower end is attached to an anchor located in the seabed, the foldable net cages are anchored by parallel slack mooring, the mooring chains are made of steel materials coated with anti-rust coatings, and the anchors are made of metal or concrete.

The present disclosure has the following beneficial effects.

1. Compared with the prior art, in the fast-laid floating breakwater according to the present disclosure, the combination of the foldable net cage and the box-type rubber airbags strengthens the integrity of the breakwater and reduces processes for connection and disassembly of the structures; when the airbags are not inflated, the breakwater can be folded and stored, the volume of the breakwater is reduced, and thus the transportation efficiency is improved; and when the airbags are inflated, the breakwater can automatically unfold, and thus the laying efficiency is improved; meanwhile, the flexible net is made of a lightweight material, which is recyclable and low in cost, therefore the construction costs of the breakwater are reduced.

2. In the present disclosure, ballast is provided by the frames and the counterweights to enable the breakwater to reach a certain immersion depth, so that the airbags are not required to provide a cavity for water filling, which simplifies the structure. The counterweights can be separated quickly after the operation is finished so that the time is saved, and the use efficiency of the breakwater is improved.

3. The sea area protected by the breakwater varies by inflating different numbers of airbags; when the protected sea area is small, only the airbags in the middle of the breakwater need to be inflated, and the cabins at two sides can be folded and tied together, and then the breakwater can reach a particular immersion depth by adjusting the number of the counterweights; when the protected sea area is large, a large number of airbags need to be inflated, so the length of the breakwater can be increased; changing the number of inflated airbags can avoid the connection process of module units, therefore decreasing the laying complexity of the breakwater, and reducing the laying time for the breakwater.

4. A configuration of the breakwater can be adjusted according to an actual wind-wave condition, and a specific method thereof is as follows: the airbags of some cabins are in an uninflated state, then the breakwater can be bent at different angles or into different shapes, and a bending state of the floating breakwater can be fixed by adjusting an angle of the mooring chain and a position of the anchor. The method is easy to operate and the breakwater can adapt to sea areas with different wind-wave conditions.

Based on the above, in the present disclosure, the foldable net cage and the box-type rubber airbags are combined together, which can reduce the dead weight of the breakwater as well as enhance the integrity of the breakwater and the adaptability of the breakwater to different working conditions. The present disclosure has the advantages of a simple structure and convenient construction, and can be applied to sea areas with different wind-wave conditions.

Figure 1:
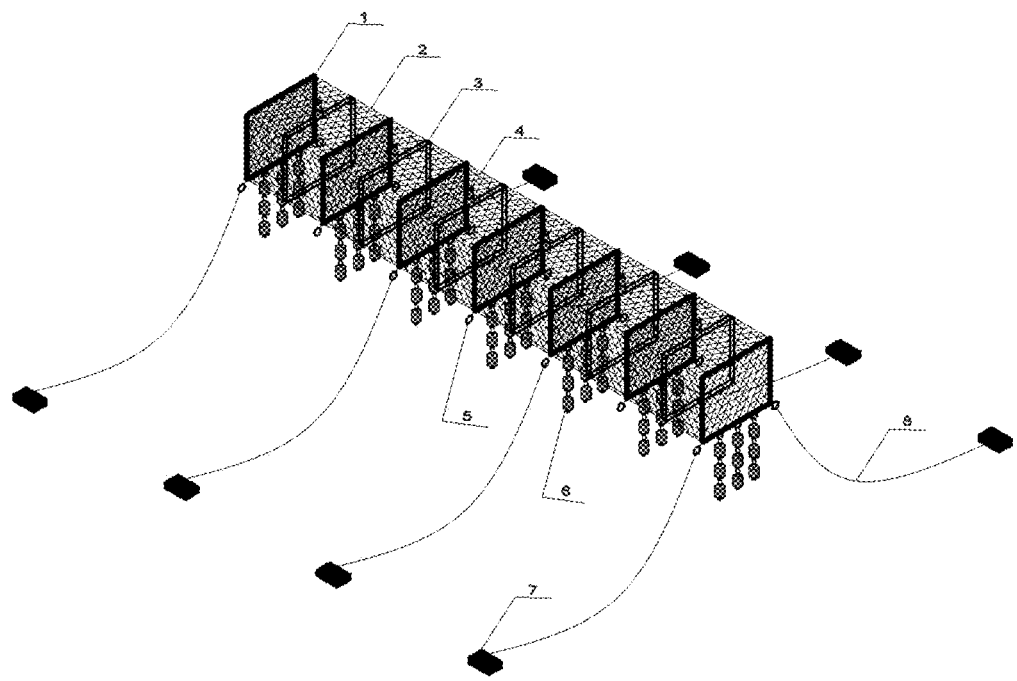
FIG. 1 is a schematic structural diagram of the breakwater according to the present disclosure.

1: frame, 2: flexible net, 3: box-type rubber airbag, 4: air valve; 5: pull ring, 6: counterweight, 7: anchor, 8: mooring chain, 9: ring, 10: spring hook.

DESCRIPTION OF EMBODIMENTS

The technical solution of the present disclosure will be further described below, but the protection scope of the present disclosure is not limited to the described embodiments.

A fast-laid floating breakwater, as shown in FIGS. 1-6, includes frames 1, a flexible net 2, box-type rubber airbags 3, pull rings 5, counterweights 6, anchors 7 and mooring chains 8. The frames 1 and the flexible net 2 are tied together through ropes to form a foldable net cage, wherein the frames 1 are a supporting structure of the foldable net cage. An upper floating structure consisting of the frames 1, the flexible net 2 and the box-type rubber airbags 3 is connected to the pull rings 5 through an upper end of the mooring chains 8, with a lower end connected to the anchors 7 to anchor the breakwater in a specific sea. Three rings 9 of the same size are welded at quartering points along a width of a lower end of the frames 1, and the rings 9 and the frame 1 are on the same plane. The counterweights 6 are connected to the rings 9 at the lower end of the frames 1 through spring hooks 10 welded at the upper end of the counterweights 6, and the counterweights 6 are connected in such a manner that the ring 9 at the lower end of a counterweight 6 is connected to the spring hook 10 at the upper end of another counterweight 6. An air valve 4 at an upper part of the box-type rubber airbags 3 is connected to the flexible net 2 through a tightening belt, and the box-type rubber airbags 3 are fixed to the middle of cabins of the net cage. The number of inflatable box-type rubber airbag 3 is selected according to the to-be-protected sea area and numbers of the mooring chain 8, the anchor 7 and the counterweight 6 are decided accordingly. The upper floating structure consisting of the frames 1, the flexible net 2 and the box-type rubber airbags 3 is anchored by parallel slack mooring. The anchors 7 have a square shape and are made of concrete. Ballast provided by the counterweights 6 and the frames 1 should enable the breakwater to meet a requirement that the gravity center of the structure is below the buoyancy center.

The counterweights are divided into several columns (three columns in this embodiment), and are connected to the lower end of the frame, so as to make the whole breakwater more stable.

Figure 2:
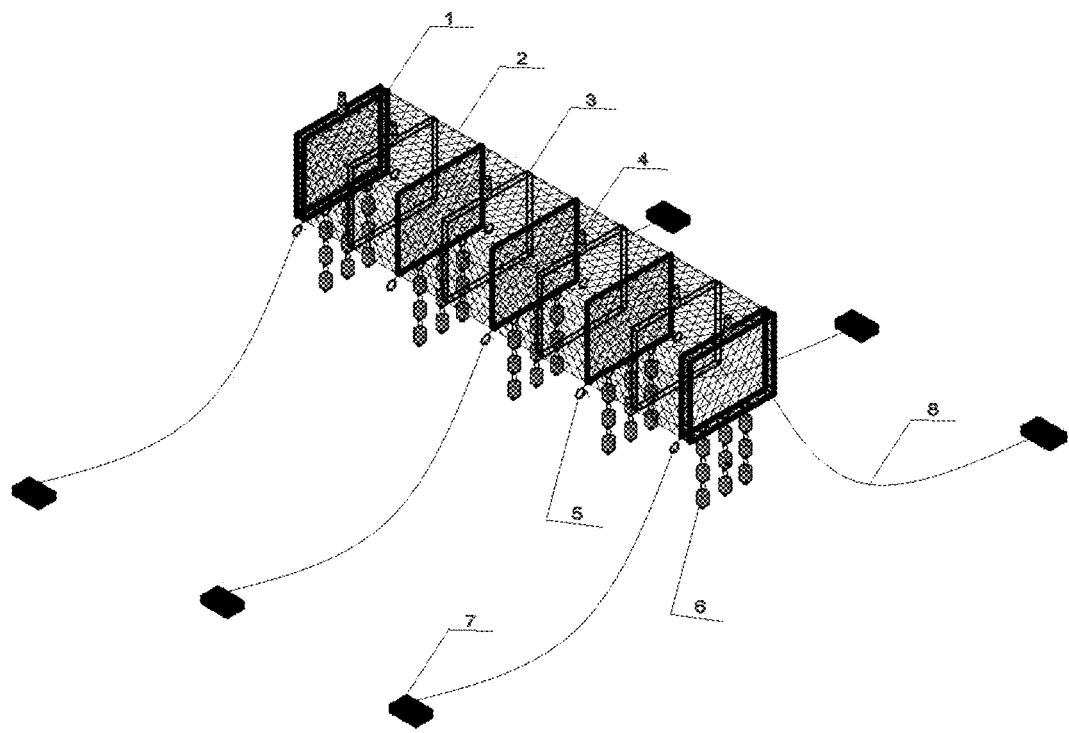
FIG. 2 is a schematic structural diagram of the second representative implementation of the present disclosure.

Working condition 1: the protected water area is small and has only one strong wave direction, and the design of the fast-laid floating breakwater is shown in FIG. 2. The floating breakwater inflates the box-type rubber airbags 3 inside only the middle four cabins, the other cabins are folded together and the frames 1 are tied and fixed through ropes, and three pairs of mooring chains 8 are used for parallel slack mooring. For a small protected sea, the floating breakwater unfolds only the middle cabins to ensure the symmetry of mass distribution, and the unfolded cabins are folded together and tied together to ensure the integrity of the floating breakwater, so as to ensure good stability of the floating breakwater under wave attack, therefore improving the effectiveness of wave protection of the floating breakwater. The mooring chains are alternately arranged at intervals of one frame 1, which can satisfy the anchoring requirement of the breakwater and can also shorten the time for arranging the mooring chains 8 and the anchors 7, thus increasing the laying rapidity of the floating breakwater.

Working condition 2: the protected water area is large and has only one strong wave direction, and the design of the fast-laid floating breakwater is shown in FIG. 1. The floating breakwater inflates all the box-type rubber airbags 3 and uses four pairs of mooring chains 8 for parallel slack mooring. When all the box-type rubber airbags 3 are inflated, the breakwater can automatically unfold into a straight-line shape, and the breakwater can protect a large sea area. The mooring chains are alternately arranged at intervals of one frame 1, which can satisfy the anchoring requirement of the breakwater and shorten the time for arranging the mooring chains 8 and the anchors 7, thus increasing the laying rapidity of the floating breakwater.

Figure 3:
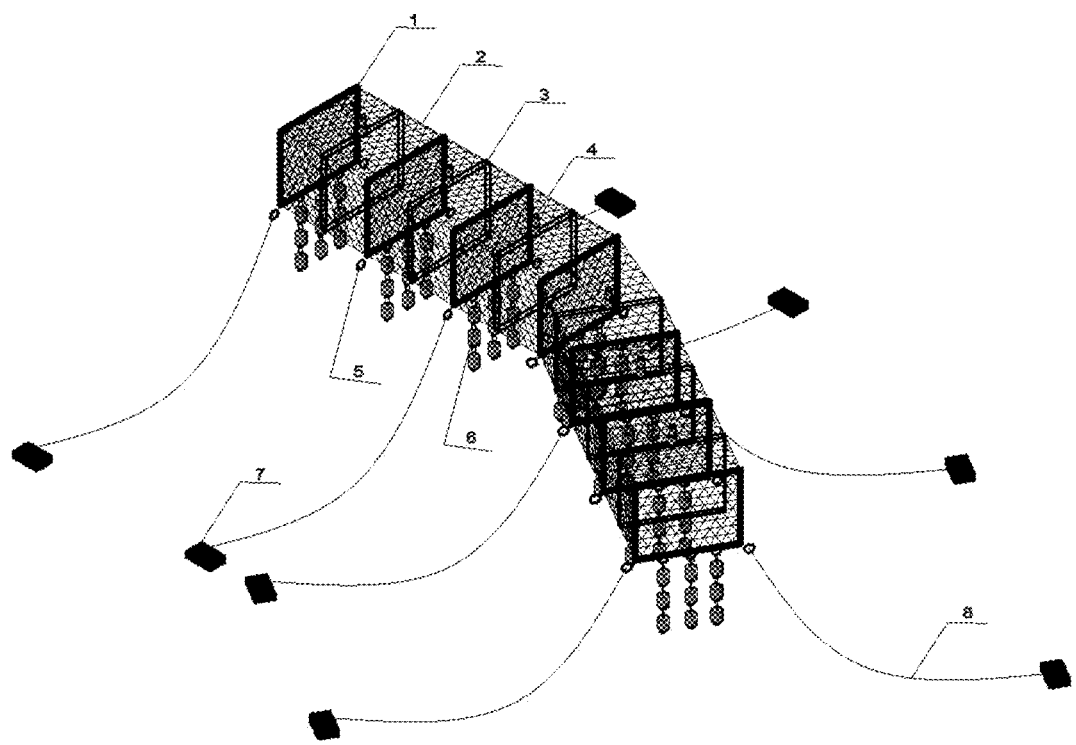
FIG. 3 is a schematic structural diagram of the third representative implementation of the present disclosure.
Figure 4:
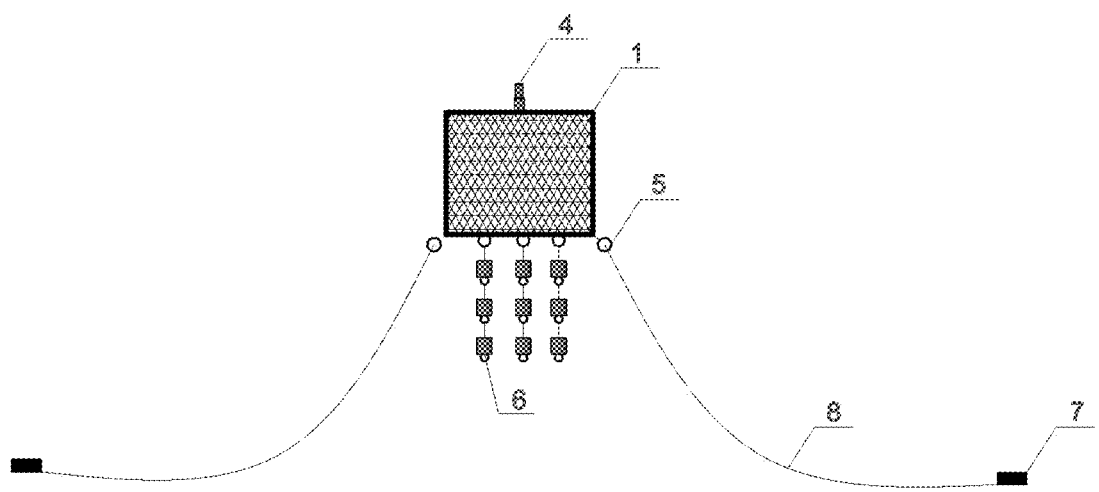
FIG. 4 is a side view of a breakwater structure.
Figure 5:
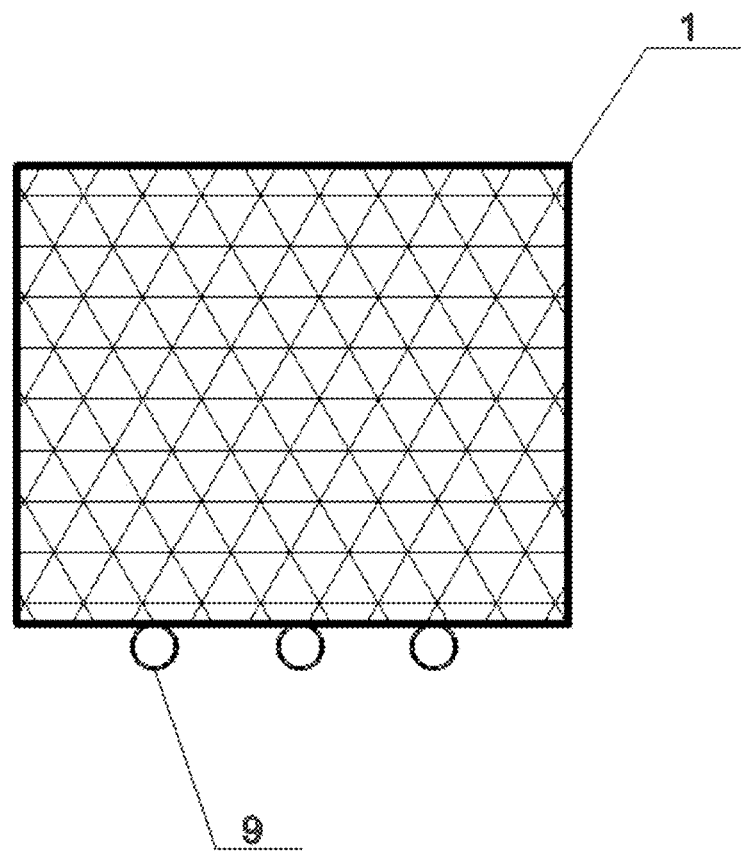
FIG. 5 is a schematic structural diagram of a frame.
Figure 6:
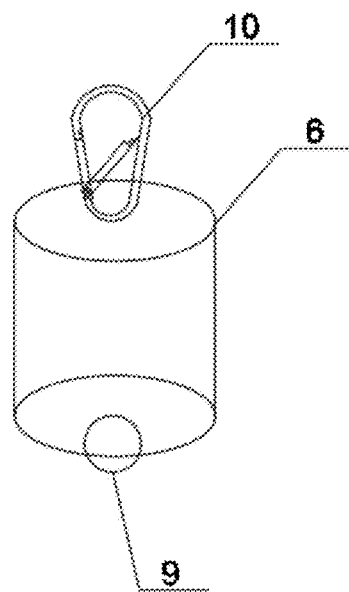
FIG. 6 is a schematic diagram of a counterweight.

Working condition 3: the protected water area is large and has two strong wave directions, and the design of the fast-laid floating breakwater is shown in FIG. 3. A certain box-type rubber airbag 3 is in an uninflated state, and then the cabin where the uninflated box-type rubber airbag 3 located can be bent at a corresponding angle as required. The bending state of the floating breakwater can be fixed by adjusting the angle of the mooring chains 8 and a position of the anchors 7, which improves the flexibility of the floating breakwater, and when facing different wave conditions, the bending angle of the floating breakwater can be rapidly regulated, so as to achieve the best effectiveness of wave protection. The floating breakwater can be bent at different angles, so that connections between module units are avoided, the laying complexity of the floating breakwater is reduced, and the laying time for the floating breakwater is shortened.

What is claimed is:

1. A fast-laid floating breakwater, comprising a foldable net cage, a plurality of box-type rubber airbags, a counterweight system and a mooring system, wherein the foldable net cage comprises a plurality of frames and a flexible net, the plurality of frames are connected to the flexible net to divide the foldable net cage into a plurality of cabins, and the plurality of frames are configured as a supporting structure of the foldable net cage; the plurality of box-type rubber airbags are fixed in the plurality of cabins, and an air valve is provided at an upper part of each of the plurality of box-type rubber airbags and is connected to the flexible net; the counterweight system is provided at bottoms of the plurality of frames; the mooring system is connected to the plurality of frames to achieve anchoring of the foldable net cage; and the foldable net cage is divided into the plurality of cabins by the plurality of frames, and each of the plurality of cabins is provided with a respective one of the plurality of box-type rubber airbags, wherein when the plurality of box-type rubber airbags are not inflated, the plurality of cabins are capable of being folded to store or connect to foldable net cages at two sides at any angle, so that a shape of the fast-laid floating breakwater is capable of being changed.

2. The fast-laid floating breakwater according to claim 1, wherein a plurality of rings for connecting the counterweight system are welded at a lower end of a respective one of the plurality of frames, and the plurality of rings and the respective one of the plurality of frames are on a same plane.

3. The fast-laid floating breakwater according to claim 1, wherein the air valve at the upper part of each of the plurality of box-type rubber airbags is connected to the net through a tightening belt, and a size of each of the plurality of box-type rubber airbags when fully inflated is consistent with a size of the cabin where each of the plurality of box-type rubber airbags is located.

4. The fast-laid floating breakwater according to claim 3, wherein each of the plurality of box-type rubber airbags comprises only one cavity inside.

5. The fast-laid floating breakwater according to claim 1, wherein the counterweight system comprises a plurality of counterweights, a number of counterweights is determined based on a requirement on an immersion depth of the breakwater, a number of inflatable airbags, and a requirement of making a gravity center of the breakwater below abuoyancy center.

6. The fast-laid floating breakwater according to claim 5, wherein a spring hook is welded at an upper end of each of the plurality of counterweights and a ring is welded at a lower end of each of the plurality of counterweights; the spring hook provided at the upper end of an uppermost counterweight of the plurality of counterweights is connected to a ring provided at a bottom of each of the plurality of frames, and the spring hook provided at the upper end of a lower counterweight of the plurality of counterweights is connected to the ring provided at a lower end of an upper counterweight of the plurality of counterweights.

7. The fast-laid floating breakwater according to claim 1, wherein the mooring system comprises pull rings, mooring chains and anchors; the pull rings are connected to two sides of a lower end of each of the plurality of frames; each of the mooring chains comprises an upper end connected to a respective one of the pull rings, and a lower end attached to a respective one of the anchors located in a seabed; and the foldable net cage is anchored by parallel slack mooring.

* * * * *